United States Patent
Roy et al.

(10) Patent No.: US 9,407,530 B2
(45) Date of Patent: Aug. 2, 2016

(54) SYSTEMS AND METHODS FOR PROVIDING DNS SERVER SELECTION USING ANDSF IN MULTI-INTERFACE HOSTS

(71) Applicant: INTERDIGITAL PATENT HOLDINGS, INC., Wilmington, DE (US)

(72) Inventors: Michel Roy, Candiac (CA); Kevin Di Lallo, Montreal (CA); Martin Jolicoeur, Dollard-des-Ormeaux (CA); Robert G. Gazda, Spring City, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 300 days.

(21) Appl. No.: 14/033,248

(22) Filed: Sep. 20, 2013

(65) Prior Publication Data

US 2014/0089523 A1     Mar. 27, 2014

Related U.S. Application Data

(60) Provisional application No. 61/704,184, filed on Sep. 21, 2012.

(51) Int. Cl.
*G06F 15/16* (2006.01)
*H04L 12/715* (2013.01)
*H04L 29/12* (2006.01)

(52) U.S. Cl.
CPC ............ *H04L 45/04* (2013.01); *H04L 61/1511* (2013.01); *H04L 61/6077* (2013.01)

(58) Field of Classification Search
CPC .................................................. H04L 61/1511
USPC ........................................................ 709/242
See application file for complete search history.

(56) References Cited

U.S. PATENT DOCUMENTS

| | | | |
|---|---|---|---|
| 7,003,555 B1 * | 2/2006 | Jungck | H04L 29/12066 370/389 |
| 2004/0148439 A1 * | 7/2004 | Harvey | H04L 63/0428 709/249 |
| 2005/0210139 A1 * | 9/2005 | Hightower | H04L 29/12009 709/227 |
| 2006/0215649 A1 * | 9/2006 | Morrall | H04L 29/12009 370/389 |
| 2007/0118667 A1 * | 5/2007 | McCarthy | H04L 29/12066 709/238 |
| 2010/0146415 A1 * | 6/2010 | Lepeska | G06F 17/30 715/760 |
| 2012/0117621 A1 * | 5/2012 | Kondamuru | H04L 29/12066 726/3 |
| 2013/0054829 A1 * | 2/2013 | Mathews | H04L 12/2809 709/238 |
| 2013/0148572 A1 * | 6/2013 | Delorme | H04W 8/26 370/328 |
| 2013/0326631 A1 * | 12/2013 | Cartmell | H04L 63/306 726/26 |
| 2014/0280963 A1 * | 9/2014 | Burbridge | H04L 61/1511 709/226 |

OTHER PUBLICATIONS

3rd Generation Partnership Project (3GPP), S2-111732, "Scenarios for Data Identification in ANDSF", Motorola Mobility, 3GPP TSG SA WG2 Meeting #84, Bratislava, Slovakia, Apr. 11-15, 2011, 2 pages.

(Continued)

*Primary Examiner* — Hamza Algibhah
(74) *Attorney, Agent, or Firm* — Condo Roccia Koptiw LLP

(57) ABSTRACT

Systems and methods for extending Inter System Routing Policies (ISRPs) of an ANDSF to enable domain name system (DNS) flows to be identified by a queried domain may be disclosed. Such systems and methods may include providing an ISRP with a routing rule that may be used to select a DNS sever or interface thereof and resolve DNS for a target domain name and/or corresponding target URL for a website.

20 Claims, 10 Drawing Sheets

(56) References Cited

OTHER PUBLICATIONS

3rd Generation Partnership Project (3GPP), TR 23.853 V0.3.1, "Technical Specification Group Services and System Aspects, Operator Policies for IP Interface Selection (OPIIS), (Release 11)", Aug. 2011, pp. 1-12.

3rd Generation Partnership Project (3GPP), TS 24.312 V11.3.0, "Technical Specification Group Core Network and Terminals, Access Network Discovery and Selection Function (ANDSF) Management Object (MO)", Jun. 2012, pp. 1-162.

3rd Generation Partnership Project (3GPP), TS 24.312 V11.0.0, "Technical Specification Group Core Network and Terminals, Access Network Discovery and Selection Function (ANDSF) Management Object (MO) (Release 11)", Sep. 2011, pp. 1-158.

Blanchet et al., "Multiple Interfaces and Provisioning Domains Problem Statement", Request for Comments-6418, Internet Engineering Task Force (IETF), Nov. 2011, pp. 1-22.

Mockapetris, P., "Domain Names-Concepts and Facilities", Request for Comments-1034, Network Working Group, Nov. 1987, pp. 1-55.

Mockapetris, P., "Domain Names-Implementation and Specification", Request for Comments-1035, Network Working Group, Nov. 1987, pp. 1-55.

Savolainen et al., "Improved Recursive Dns Server Selection for Multi-Interfaced Nodes", Draft-ietf-mif-dns-Server-selection-12, Internet Draft, Internet Engineering Task Force, Aug. 2012, pp. 1-31.

Wasserman et al., "Current Practices for Multiple-Interface Hosts", Request for Comments-6419, Internet Engineering Task Force (Ietf), Nov. 2011, pp. 1-21.

\* cited by examiner

```
 0  1  2  3  4  5  6  7  8  9  0  1  2  3  4  5  6  7  8  9  0  1  2  3  4  5
+--+--+--+--+--+--+--+--+--+--+--+--+--+--+--+--+--+--+--+--+--+--+--+--+--+--+
|                                                                               |
/                              QNAME                                            /
/                                                                               /
+--+--+--+--+--+--+--+--+--+--+--+--+--+--+--+--+--+--+--+--+--+--+--+--+--+--+
|                              QTYPE                                            |
+--+--+--+--+--+--+--+--+--+--+--+--+--+--+--+--+--+--+--+--+--+--+--+--+--+--+
|                              QCLASS                                           |
+--+--+--+--+--+--+--+--+--+--+--+--+--+--+--+--+--+--+--+--+--+--+--+--+--+--+
```

SYSTEMS AND METHODS FOR PROVIDING DNS SERVER SELECTION USING ANDSF IN MULTI-INTERFACE HOSTS

CROSS REFERENCE TO RELATED APPLICATIONS

This application claims the benefit of U.S. Provisional Application No. 61/704,184, filed Sep. 21, 2012, the disclosure of which is incorporated herein by reference in their entirety.

BACKGROUND

Today, a host or device such as a multiple interface (MIF) host or device may have multiple interfaces that may be connected to multiple networks such as IP networks each of which may be different. Such a host or device may obtain configuration information from each network. Some of the configuration information may be global to an interface or node, some of the configuration information may be local to the interface or node, and/or some of the configuration information may be subnet specific. The host or device may have to, therefore, make decisions about default routing, DNS server selection, choice of interface for packet transmission, treatment of the configuration information received from the various networks, and the like. For example, each interface may provide a domain name system (DNS) configuration associated with different DNS servers to the host or device, however, the host or device typically does not know which of those DNS servers to use when accessing a particular website or domain name or uniform resource location (URL) associated therewith. When each of the DNS may be equivalent (e.g., may include the same database of domain names or URLs), either DNS server may be used by the host or device to access the website associated with the domain name or URL, and, as such, the DNS is resolved appropriately. Typically, however, a DNS server has private entries or namespaces associated with, for example, domain names or URLs that may not available on other DNS servers. As such, the host or device may have to pick a DNS server to use to resolve the DNS associated with the domain name or URL or a DNS resolution failure may occur and the device or host may be unable to reach the website associated with the domain name or URL being accessed.

Additionally, when contradictory global configuration information may be obtained from different networks, host or device decisions such as MIF decisions (e.g., DNS resolution decisions) may produce various issues and, as such, some of these decisions may have negative or unwanted effects including preventing communication between the hosts or devices and networks and/or may provide challenges to traditional networking stacks. To help alleviate such issues, approaches for improving DNS selection for a host or device such as a MIF that may deal with private DNS entities or namespaces may be used. Unfortunately, such approaches do not address situations where a domain name resolves to different peer entities on different networks with possibly different set of services. Additionally, such approaches have a scalability that may be restricted due to the DHCP messages size that limits the number of domains and networks that may be carried in the RDNSS selection option.

SUMMARY

Systems and methods for extending and/or using Inter System Routing Policies (ISRPs) associated with ANDSF to resolve domain name system (DNS) flows may be provided and/or used as described herein. For example, a device such as a wireless transmit/receive unit (WTRU) with multiple interfaces may receive an ISRP management object (MO). The ISRP MO may include a DNS query name or domain name and a routing rule associated with the DNS query name. In an embodiment, the routing rule may include and/or specify a network, a DNS server, and/or an interface associated with the DNS server (e.g., that may be associated with the network) to select and route a DNS query to. The DNS server selected may be capable of resolving a private resource for the domain name in the DNS query. The device may determine whether a target domain name or query name associated with a website to be accessed via, for example, an application on the device may match the DNS query name included in the ISRP MO (e.g., included in the DNS query name or domain name of the ISRP MO). The device may route the DNS query to the DNS server associated with the interface included in and/or specified by the routing rule (e.g., via an interface identifier included in the routing rule that may specify the interface) when, based on the determination, the query name in the DNS query matches the DNS query name included in the ISRP MO to enable the domain name to be resolved by the DNS server associated with the interface included in the routing rule such that the private resource of the domain name may be available to the device.

In an embodiment, the DNS server selected based on the ISRP MO may be a secondary DNS server. For example, a primary DNS server or interface thereof may be selected and the DNS query associated with that selection may be made. The device may intercept the DNS query of that primary DNS server selection. The DNS query may include a query name associated with a target domain name and an identifier such as an IP address (e.g., a primary DNS server IP address and/or any other suitable identifier that may specify an interface associated with the primary DNS server) associated with a primary DNS server and/or interface associated therewith to resolve the domain name. The device may further receive the ISRP MO comprising a DNS query name or domain name such as DNS query name or domain name node, attribute, or field and a routing rule associated with the DNS query name or domain name. In an embodiment, the routing rule may include and/or specify an interface associated with a secondary DNS server (e.g., via an interface identifier included in the routing rule that may specify the interface associated with the secondary DNS server) to select and route the DNS query to. The secondary DNS server may be capable of resolving a private resource for the target domain name in the DNS query. The device may determine whether the query name in the DNS query may match the DNS query name or domain name included in the ISRP MO. The device may route the DNS query to the secondary DNS server and/or the interface associated therewith using an IP address (e.g., a secondary DNS server IP address) associated with the interface specified in the routing rule when, based on the determination, the query name in the DNS query matches the DNS query name or domain name included in the ISRP MO such that the target domain name may be resolved by the secondary DNS server associated with the interface that may be specified and/or included in the routing rule and the private resource of the domain name may be available to the WTRU.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

FIG. 5 depicts an example embodiment of a question section formation of a DNS query.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Systems and/or methods provided herein may enable or provide DNS server selection using ANDSF and, for example, an ISRP MO associated therewith. For example, a device such as a WTRU may not know which of its interfaces to use to resolve DNS for a domain name and/or target URL associated with a website. The ISRP MO, which may include one or more routing rules, may be used to indicate which DNS server to select and resolve the domain name and/or target URL.

Figure 1A:
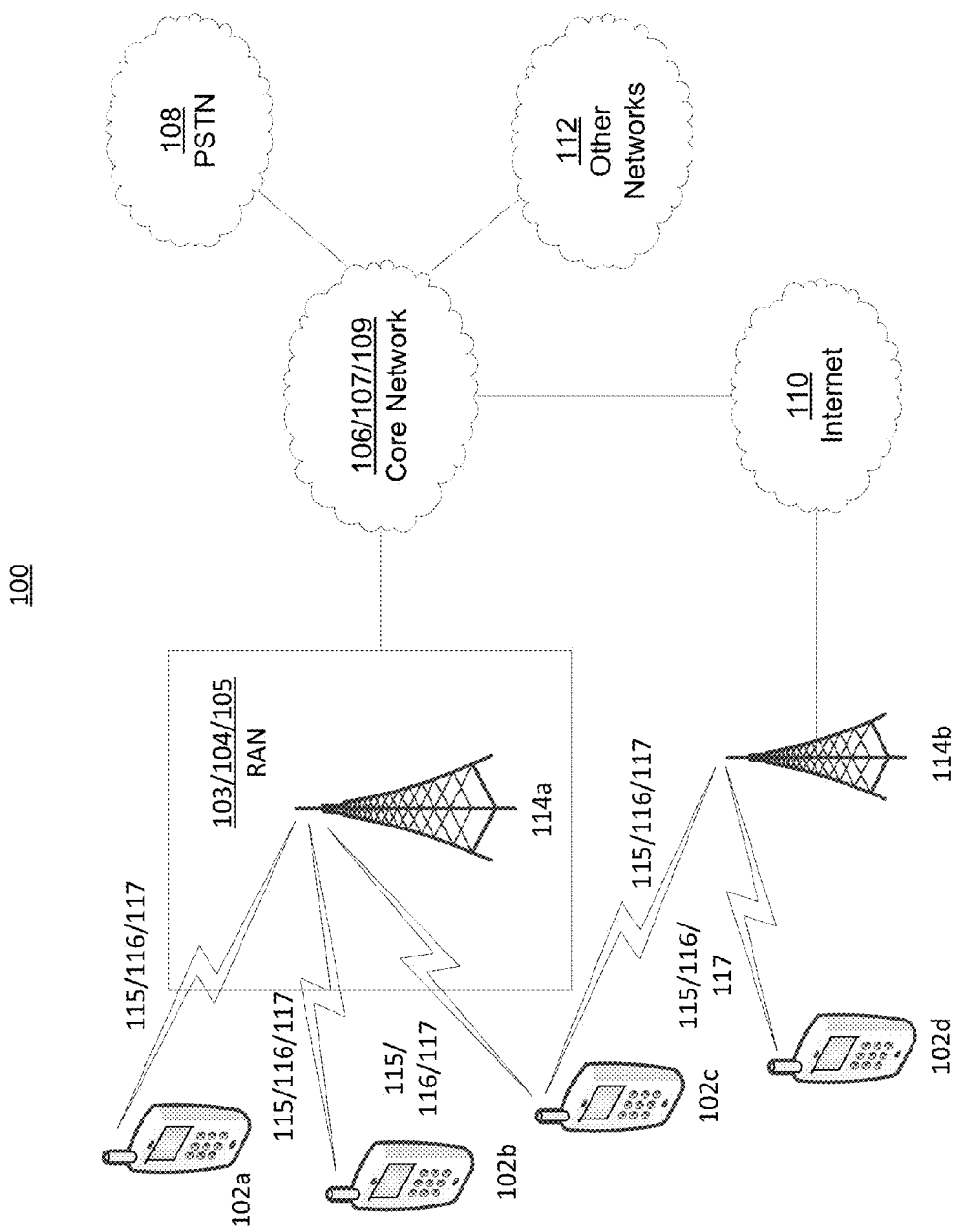
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
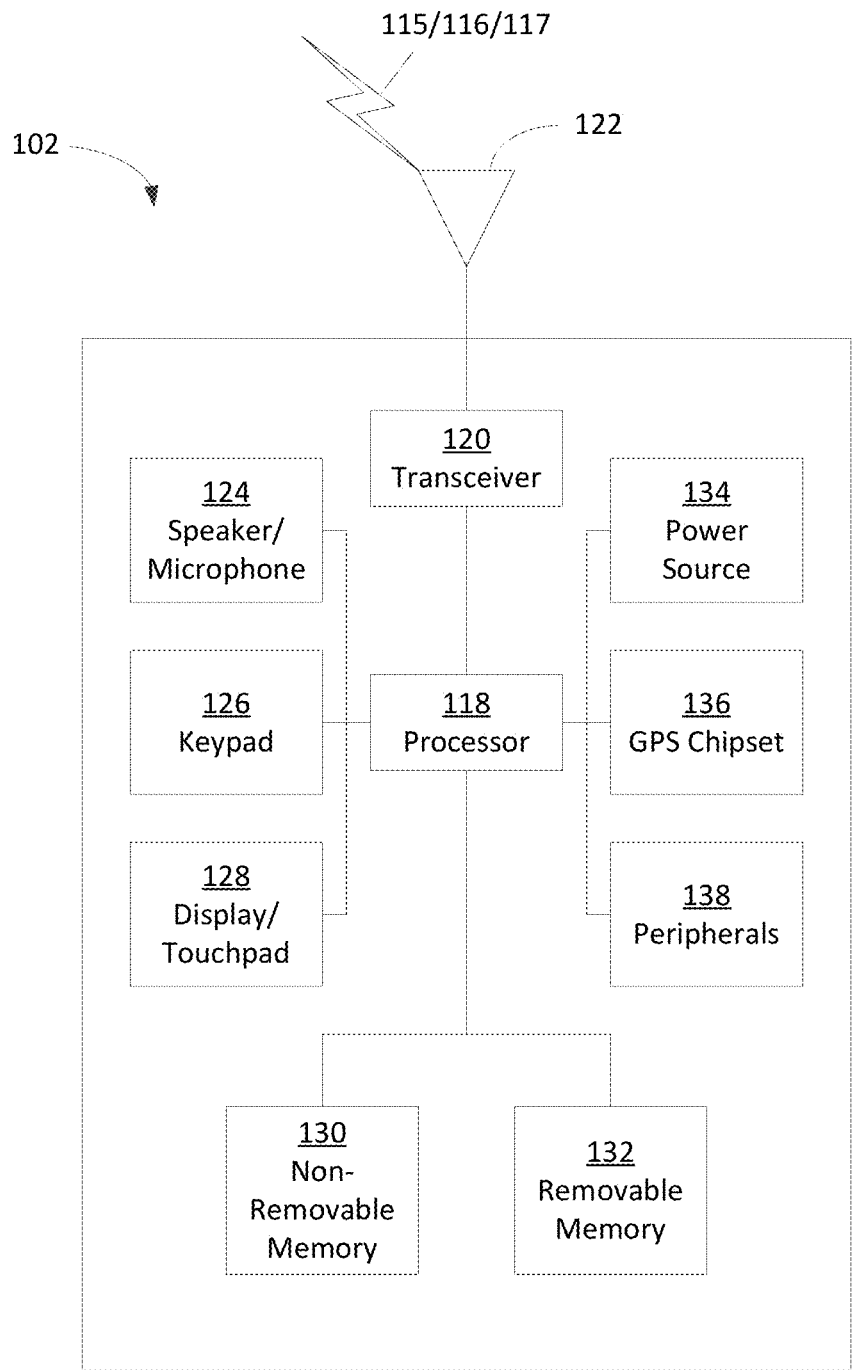
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
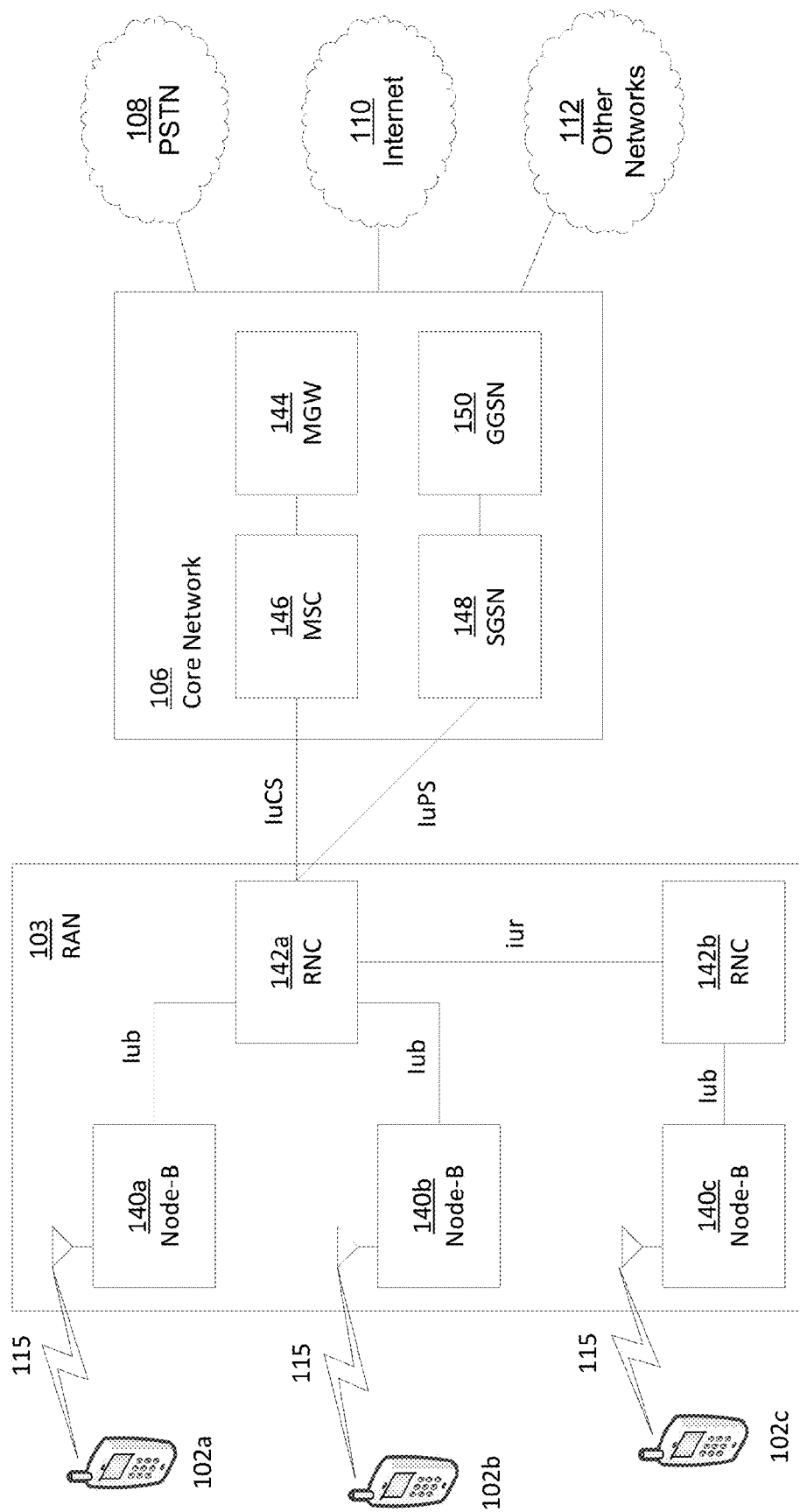
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
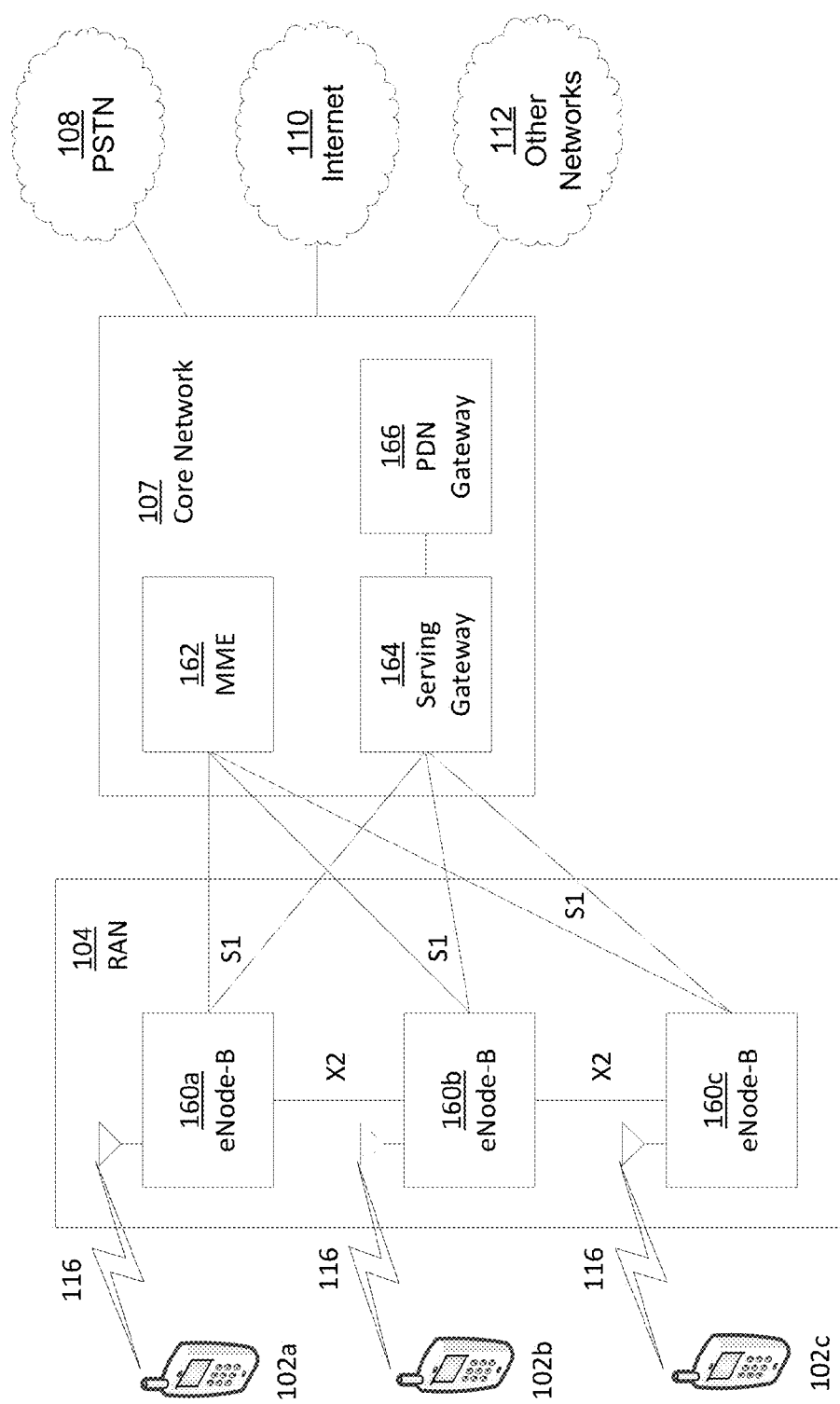
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an Si interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
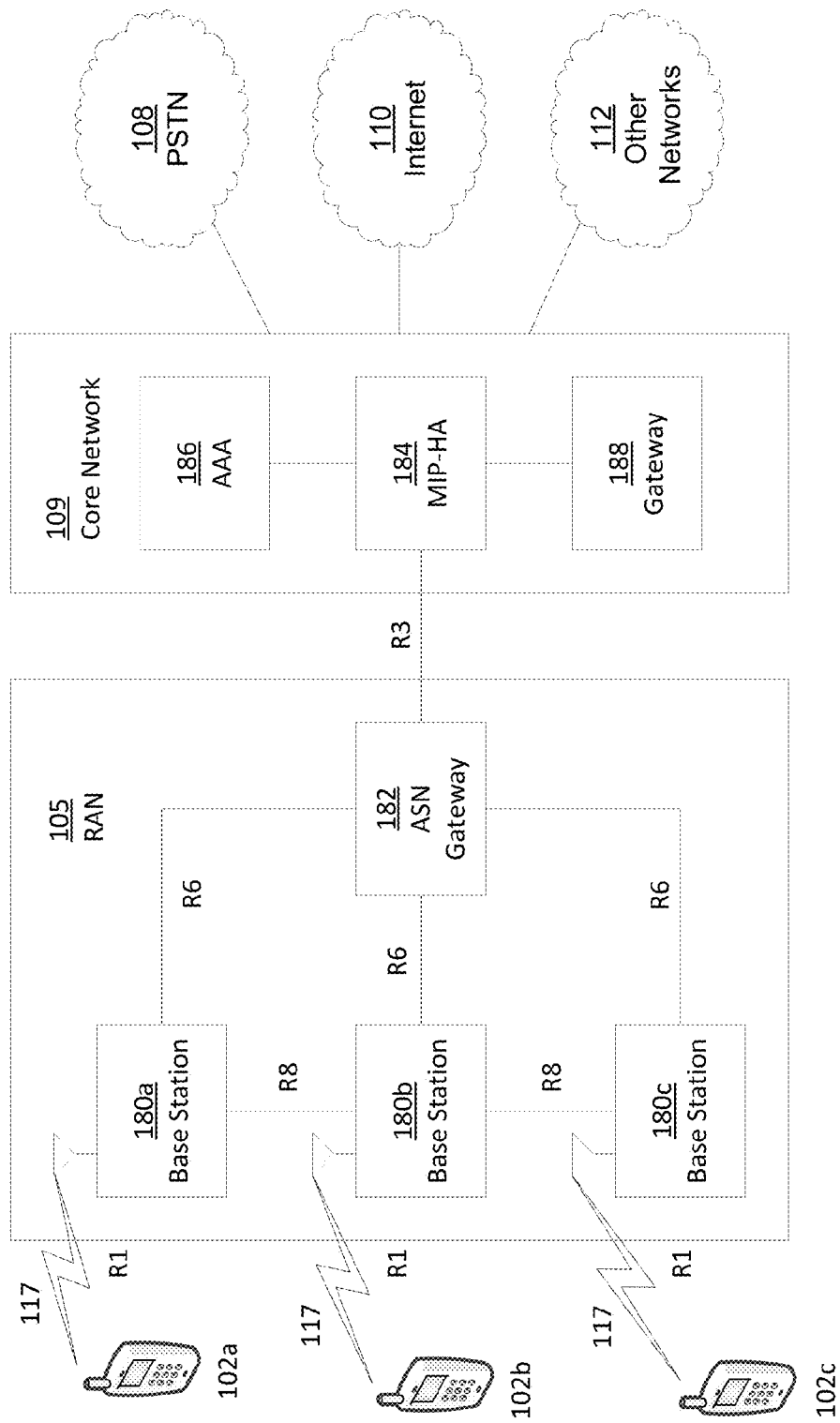
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

As described herein, a device or host such as a WTRU that may include multiple interfaces (e.g., a multiple interface (MIF) device or host) may be connected to multiple IP networks and, for example, may have the capability to concurrently attach to multiple IP networks. The multiple IP networks may include any suitable network that may use an Internet Protocol (IP) including a physical network such as an Ethernet network, a wireless local area network (WLAN), a 3GPP network, and/or the like; a virtual network such as a tunnel, a virtual private network (VPN), a virtual local area network (VLAN); and/or any other suitable network. According to an embodiment, the host such as the MIF host may obtain configuration information from each network. Some of the configuration information may be global to a node, some of the configuration information may be local to an interface, and/or some of the configuration information may be subnet specific (e.g. may be information associated with a logical visible subdivision of an IP network where hosts that may belong to a subnet may be addressed with a common IP address prefix including, for example, the most-significant bit group of the address).

Based on such configuration information, the host may make decisions about default routing, domain name system (DNS) server selection, choice of interface for packet transmission, treatment of the configuration information received from the various networks, and the like. For example, the MIF device may select a server associated with DNS (e.g., which may be a hierarchical distributed naming system for computers, services, or other resources that may be connected to the Internet or a private network). In an example embodiment, the DNS server that may be selected may associate various information with domain names assigned to each of the participating entities and/or may resolve queries for these names into IP addresses for the purpose of locating computer services and devices.

When contradictory global configuration information may be obtained from different networks, host decisions such as MIF decisions may produce various issues and, as such, some of these decisions may have detrimental effects like preventing the ability to provide communication between the hosts and networks. To help alleviate some of such issues and/or effects, approaches for improving DNS selection for a host such as a MIF that may deal with private DNS namespaces may be used. Such approaches may not address situations where a domain name resolves to different peer entities on different networks with possibly different set of services. Additionally, such approaches have a scalability that may be restricted due to the DHCP messages size that limits the number of domains and networks that may be carried in the RDNSS selection option. According to an example embodiment, a host such as a multiple interfaces host (or a MIF host) may present challenges for traditional networking stacks.

As such, systems and methods described herein may be and/or may use an extension for a device or host such as a MIF device or host. The extension may be an extension to DHCP and/or may include an algorithm to improve Recursive DNS Server Selection (RDNSS) selection. The extension described herein may be used independently and/or with current extensions. The extension described herein may help address one or more issues or problems that may be experienced by a device such as a MIF device including various DNS problems or issues that may be incurred using such a device and/or how operating system (OS) implementations deal with such problems or issues.

A management object (MO) may be defined (e.g., in 3GPP) that may be used by an Access Network Discovery and Selection Function (ANDSF) and a device to select and/or resolve DNS. In an embodiment, a MO that may be used as described herein may be an Inter-System Routing Policies (ISRP) MO that may define rules for routing traffic between the different interfaces of a host or device such as a MIF host or device. The extension described herein may add the capability to route DNS requests according to domain name query content (e.g., content of a DNS query name or a domain name that may be queried when a DNS query may be performed).

As described herein, the extension and/or modification may provide enhancements for DNS server selection. Such enhancements may include an extension of the ANDSF Inter System Routing Policy (ISRP) that may enable routing DNS requests based on the DNS query domain name. For example, embodiments disclosed herein may enable policy makers to define rules in an ISRP policy that may route specific DNS requests to specific IP Networks thereby enabling a device such as MIF device to decide or determine which of the networks and DNS servers associated therewith to use for a particular website or uniform resource locator (URL). In an embodiment, using such rules may enable a policy maker to provide the list of private resources and associated domain names and URLs to, for example, ensure that corresponding DNS requests for such resources may be routed to appropriate networks.

Figure 2:
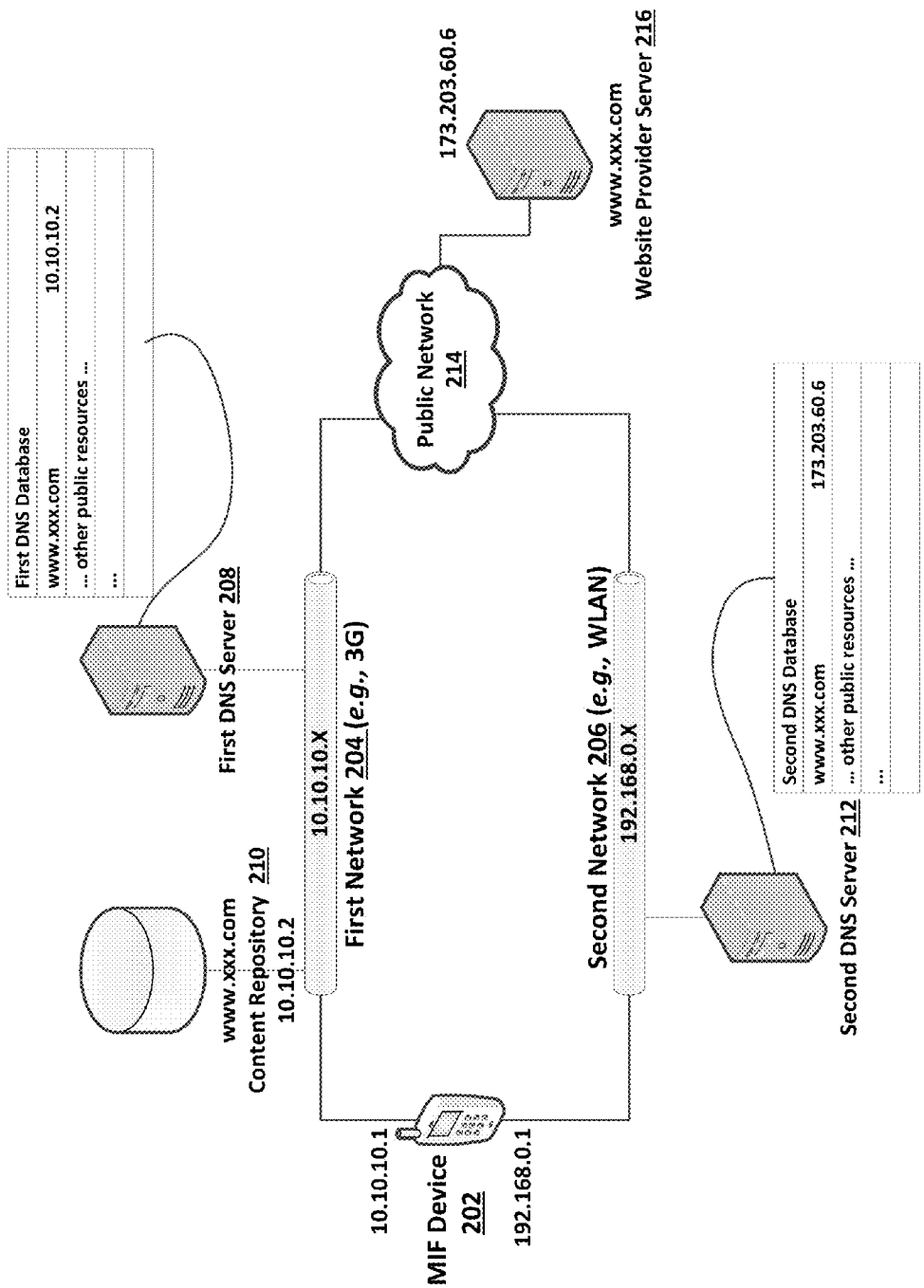
FIG. 2 depicts an example embodiment of an architecture for a host device such as a multiple interface (MIF) host device that may be connected to multiple IP networks and may use a domain name to resolve entities as described herein.

FIG. 2 depicts an example embodiment of a device connected to multiple interfaces such as a MIF device or WTRU that may result in a domain name situation. In an embodiment, such a domain name situation shown in FIG. 2 may be addressed with one or more embodiments or features described herein. As shown in FIG. 2, a device 202 (e.g., WTRUs 102a-d shown in FIGS. 1A-1E) may be include multiple interfaces that may be connected to different networks. For example, the device 202 may be connected to a first network 204 via a first interface such as first interface 218 shown in FIG. 4 and a second network 206 via a second interface such as second interface 220 shown in FIG. 4. In an example embodiment, as shown, the first network 204 may be a 3G network and the second network 206 may be a wireless local access network (WLAN). The first network 204 and second network 206 may provide or have a range of IP addresses associated therewith (e.g., 10.10.10.X and 192.168.0.X, respectively, as shown) such that the device 202 may be connected to the first network 204 via the first interface using a first IP address (e.g., 10.10.10.1) in the range of IP address associated therewith and may be connected to the second network 206 via the second interface using a second IP address (e.g., 192.168.0.1) in the range of IP addresses associated therewith. The first and second networks 204, 206 respectively may also be connected to a public network 214 (e.g., the Internet) such that the device 202 may connect to a website that may be provided by a website provider server 216 via the public network 214.

In an embodiment, the first network 204 may include or have a first DNS server 208 and a content storage repository 210 associated therewith. The content storage repository 210 may provide content for a particular website such as www.xxx.com that may be exclusive to the first network operator (e.g., an exclusive content) as described herein. The second network 206 may include or have a second DNS server 212 associated therewith. According to example embodiments, the first and second DNS servers 208, 212 may have IP addresses associated therewith that may be in the range of IP addresses provided by the first and second networks 204, 206 respectively.

The first and second DNS servers 208, 212 may be used to associate various information with domain names assigned to websites or entities that may provide content and/or may resolve queries for these names into IP addresses for the purpose of locating services and/or servers that may provide such websites and/or content associated therewith. According to an embodiment, the first and/or second DNS server 208, 212 may include a mapping, table, or association for a domain name of a website with the address or location of a device, repository, server, device, and/or the like that may provide or deliver content of or associated with the website. For example, as shown in FIG. 2, the first DNS server 208 may include a mapping, table, or association for the domain name www.xxx.com of a website with the repository IP address (e.g., 10.10.10.2) of the content repository 210 that may be used to provide, for example, content of the website. As described herein, such content that may be provided by the content storage repository 210 may be available, for example, exclusively to customers of the first network 204 and, as such, may be a private resource or entity that may be resolved by the first DNS server 208 and not the second DNS server 212.

According to an embodiment, the second DNS server 212 may include a mapping, table, or association for the domain name www.xxx.com of the website with a public IP address (e.g., 173.203.60.6) of the website provider server 216 that may host and provide content for the website via the public network 214. As described herein, such content that may be provided by the website provider server 216 may be, for example, publically available to users accessing the website and, as such, may be publically resolved by the second DNS network 212 using the website provider server 216.

As described herein, the first and second IP addresses (e.g., 10.10.10.1 and 192.168.0.1) may provide connections to the first and second networks 204, 206 respectively. According to an example embodiment, such connections may be used to provide and/or receive information such as information about the first and second DNS server 208, 212 themselves, information on which IP addresses to connect to for a particular domain name and website, and/or the like. For example, the device 202 may receive information such as the mapping, table, association, and/or the like about the first DNS server 208 and/or information included therein via the connection provided by the first IP address (e.g., 10.10.10.1) to the first network 204. The device 202 may receive information such as the mapping, table, association, and/or the like about the second DNS server 212 via the connection provided by the second IP address (e.g., 192.168.0.1).

With the device 202 having multiple interfaces to the first and second networks 204, 206, the domain name www.xxx.com may resolve to different entities such as the first DNS server 208 and content repository 210 and/or the second DNS server 212 and website provider server 216 depending on which interface such as the first IP address and/or the second IP address that may be issued (e.g., that the DNS query may issue). Although each interface (e.g., via the first and second IP addresses) to the first and second network 204, 206 may provide a DNS configuration, the device 202 may not know which of the first and second DNS servers 208, 212 to use to resolve the domain name www.xxx.com. The operating system of the device 202 may include, for example, a default action or algorithm for the device 202 to perform when the device 202 may have multiple interfaces that may be connected to multiple networks such as the first and second networks 204, 206. For example, in an embodiment, the operating system may dictate that the device 202 select or choose a default DNS or interface thereof such as the most recent interface that may have been connected to resolve a DNS. If the last interface connected may be the interface to the second network 206, the device 202 may resolve the DNS for the domain name www.xxx.com using the second DNS server 212 such that the content for the website may be provided, delivered, and/or served by the website provider server 216 via the public network 214 (e.g., the publically available content may be provided, served, and/or delivered) based on the mapping, table, or association in the second DNS server 212. As such, the user device 202 may not receive the exclusive content associated with the domain name www.xxx.com and its website that may be available via the first network 204 even though the user may be a customer of the first network 204.

In example embodiments, as described herein, the device 202 may include a policy or provision, for example, an ANDSF policy that may be used by the device 202 to select the appropriate DNS server for resolving DNS for domain names such as www.xxx.com for websites such that the DNS may be resolved on the appropriate network to receive content such as exclusive content from private resources such as the content repository 210. For example, the device 202 may be provisioned with and/or may include a policy such as an ANDSF policy as described herein specifying that the DNS for the domain name www.xxx.com be routed to a first network 204 such as a 3G network or a 3G IP network such that the first DNS server 208 may resolve the private resource and may serve content associated with the website from the content repository 210 as described herein. In an embodiment, if the first network 204 such as the 3G network may be connected, the policy and/or provision may be used by the device 202 and the DNS may be routed such that the domain name www.xxx.com may be resolved by the first DNS server 208 to the content repository 210 (e.g., a private resource) to serve, deliver, or provide the content for the website. If or when the network may become disconnected, the policy or provision may not be used and the DNS, in an embodiment, may then be routed to, for example, the second network 206 such as a WLAN such that the domain name www.xxx.com may resolve to the public resource (e.g., with the WLAN).

As described herein, in one embodiment, an ANDSF ISRP such as an ANDSF ISRP MO may be modified, extended, and/or used to provide a policy or provision for the device 202 to use to route DNS queries for domain names. For example, the ISRP MO of the ANDSF may be modified such that an existing node or entry may be used to enable or allow DNS flows to be identified by a domain name such as a queried domain name and/or may include a mapping, association, and/or the like for the same (e.g., may include a mapping and/or association of which DNS server such as the first or second DNS servers 208, 212, respectively, to use for DNS resolution). The ISRP MO of the ANDSF may be extended such that a node or entry may be used to enable or allow DNS flows to be identified by a domain name such as a queried domain name and/or may include a mapping, association, and/or the like for the same (e.g., may include a mapping and/or association of which DNS server such as the first or second DNS servers 208, 212, respectively, to use for DNS resolution).

For example, a device with multiple interfaces such as the device 202 may use such information that may be included in new or existing nodes to route the specified DNS requests according to the ISRP routing rules. For example, the device such as the device 202 may perform a DNS request. In an embodiment, the device may determine whether an ISRP rule matches a domain name or a queried domain name associated with the DNS request, for example, based on the information. If one of the ISRP rule matches the queried domain name, the DNS request may be routed based on or according to the routing rules specified in the ISRP. If no ISRP rule may match the queried domain name, the DNS request may be routed according to or based on other techniques and/or methods that the device may support such as a default action or resolution including using the DNS server of the last connected interface that may be dictated by the operating system, and/or any other suitable techniques.

In an embodiment, the ISRP management object (MO) that may be served to a device may include the rules or information that may enable or allow routing DNS flows by a DNS query domain name as described herein. For example, an IPFlow node or sub-node of the ISRP such as an Access Network Discovery and Selection Function (ANDSF) Management Object (MO) may be modified to include information or rules such a mapping of domain names and a DNS server that may be used by the device to determine which DNS such as DNS servers 208, 212 to use to resolve a domain name (e.g., www.xxx.com).

Figure 3A:
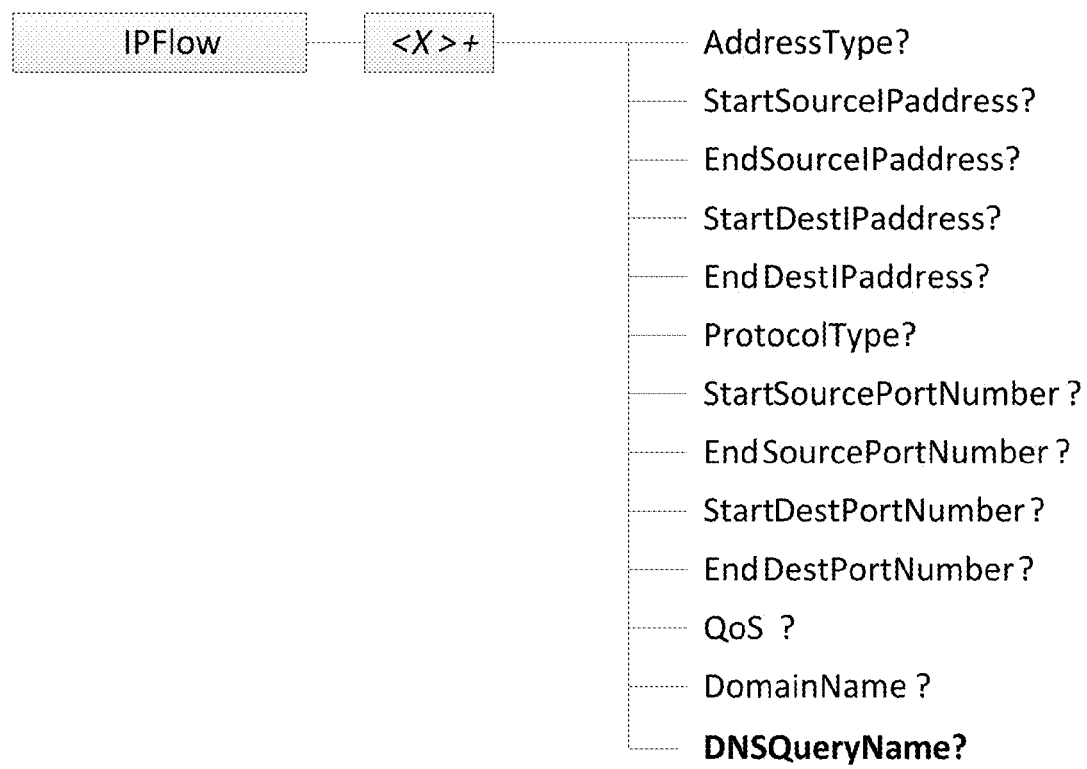
FIGS. 3A-3B depict example embodiments of an IP flow sub-node of an ISRP that may include a DNSQueryName node, attribute, or field and/or a DomainName node, attribute, or field.

For example, an IPFlow node or sub-node of the ISRP such as a ISRP MO (e.g., or the ANDSF ISRP MO) may be enhanced to modify an existing node and/or to provide a new node that may include information or rules such as a mapping of domain names and a DNS server and/or network to route the DNS for the domain name and/or an existing node may be modified to provide such information or rules. As shown in FIG. 3A, the IP flow node or sub-node (e.g., a DomainName node) thereof may be enhanced with an optional DNSQueryName attribute. According to an embodiment, the DNSQueryName may be a string that may identify a domain, specific DNS flows, and/or the like and/or which DNS server to resolve (e.g., a DNS resolution for) the domain name, specific DNS flows, and/or the like. For example, to identify a domain, specific DNS flow, and/or the like and determine a DNS resolution thereof, the device may compare the domain, specific DNS flows, and/or the like with a QNAME (e.g., a query name) value of a DNS message. According to an example embodiment, the DNSQueryName may be defined to be an exact match of the QNAME or a partial match (e.g., a wildcard match) of the QNAME to enable or allow the definition of multiple DNS domains using an IPFlow (e.g., a single IPFlow).

Figure 3B:
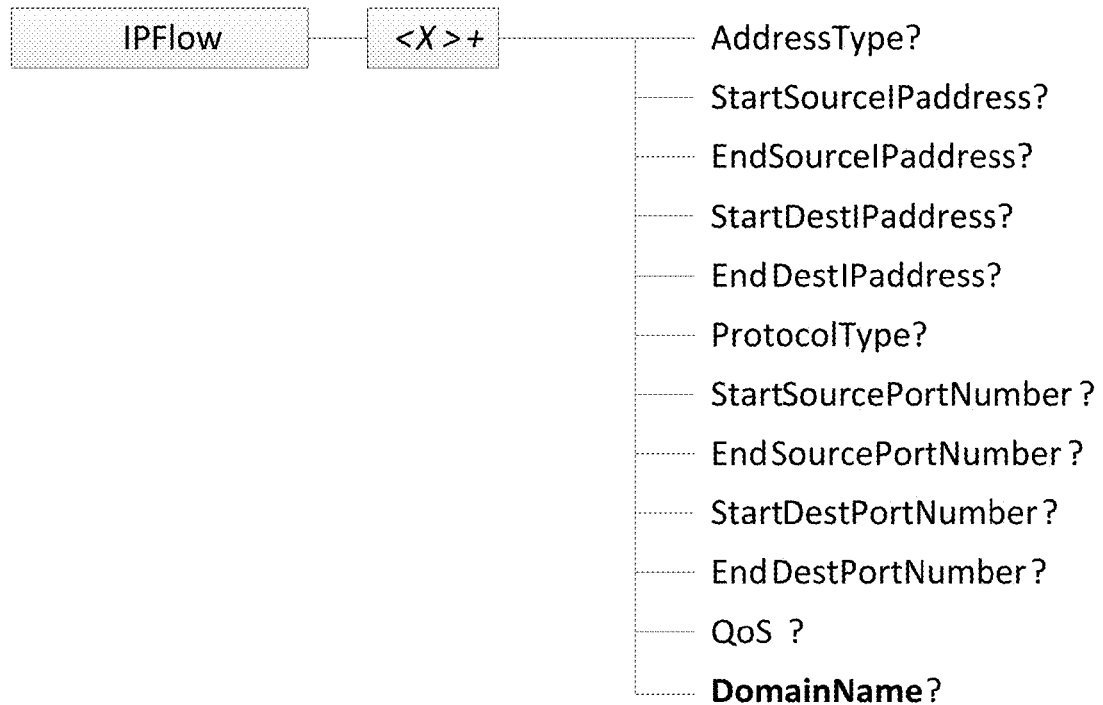

In an embodiment, a node such as the ANDSF ISRP MO DomainName node as shown in FIG. 3B may be modified and used to enable DNS flows to be identified, for example, by a queried domain name such that the device may use this information to route the specified DNS requests according to the ISRP routing rules. The DomainName may be a string that may identify a domain. Additionally, the DomainName node may serve, for example, multiple purposes such as identifying flows targeted to a specified domain name (e.g., resolved flows) to route them and/or to route DNS queries (e.g., the DNS Flows), as described herein, that may be initially issued to resolve the domain name to an IP address.

The DomainName may be used to identify specific DNS flows by comparing it to the information associated the DomainName with a QNAME value of the DNS message as described herein. In an embodiment, the DomainName may be defined to be an exact match of the QNAME or a partial match (e.g., wildcard match) of the QNAME that may enable the definition of multiple DNS domains using a single IPFlow.

In an embodiment, using the DomainName leaf or node to perform DNS selection may simplify ANDSF policy writing. For example, routing the DNS flows and subsequent resolved flows may both be covered by the same ANDSF rule such that the DNS flows and resolved flows may be routed to the same network.

To resolve DNS flows on a different network than subsequent resolved flows, the DNSQueryName may be used. For example, two rules may be provided and/or used where one rule may define the DNSQueryName flow to route the DNS flows to the desired network and a second rule may be used to route the Resolved Flows to another network.

If the QNAME of a DNS request or query may match the DNSQueryName and/or the DomainName, the DNS query or request may be routed to an interface and corresponding DNS server thereof defined by a routing rule of the ISRP MO as described herein. For example, the routing rule may include an identifier of the interface and/or the DNS server such as an IP address associated with a DNS server or interface thereof to resolve the DNS query such that the DNS request or query may be routed to the DNS server associated with the interface included in the routing rule. If one of the ISRP rules includes a DNSQueryName or DomainName node that may match the queried domain name (e.g., the QNAME), the DNS query may be routed according to the routing rules specified in the ISRP (e.g., the DNS query may be routed to the DNS server associated with the interface specified by the routing rule). If no ISRP rule may match the queried domain name (e.g., the QNAME), the DNS query may be routed according to other techniques that the device may support including, for example, legacy DNS selection techniques, advanced DNS selection techniques, and/or any other suitable form of DNS selection. The ANDSF ISRP MO and/or DNS resolution using the information therein may further improve scalability in an embodiment. For example, in an embodiment the size of an ISRP policy may not be limited like DHCP packet size may be, and, thus, the number of private resources that may be specified in the policy may be limited by the ANDSF maximum policy size that may be greater than the DHCP packet size.

Figure 4:
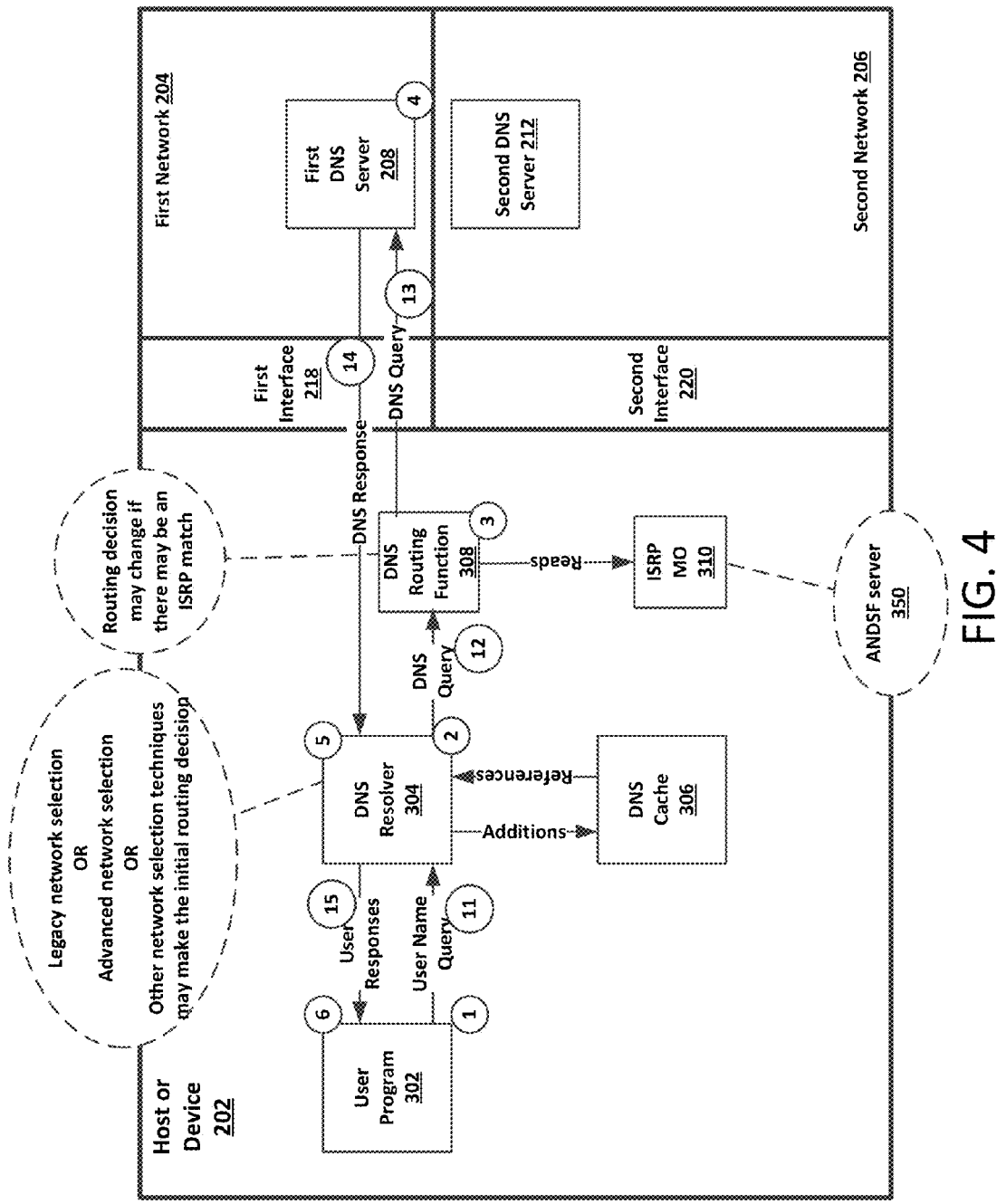
FIG. 4 depicts an example embodiment of a DNS routing method and/or function that may be used with a host such as a MIF host.

FIG. 4 depicts an example embodiment of a DNS routing method and/or function that may be used with a host such as the device 202 (e.g., including the WTRUs 102a-d) described herein. According to an example embodiment, a user program 302 included in the host or device 202 may want or wish to resolve a domain name to establish a connection. At 1, the user program 302 may interact with a DNS Resolver 304 to, for example, initiate or facilitate the resolution of a domain name. For example, an application programming interface (API) may be located or established between the user program 302 and the DNS resolver 304. The API may be OS specific according to an embodiment. As shown, the user program 302 may use and/or interact with the API to trigger the DNS resolver 304, for example, at 1 and to provide a user name query or a domain name query that may include a target domain name or target URL such as www.xxx.com at 11. An example API that may be used may be the InetAddress Java class that may provide a getByName(String url) API that may result in triggering the DNS resolver 304 when invoked. An API that may be used may be the gethostbyname(const char url) class or function provided in C++ may perform the same task. Each networking platform may have such APIs that may facilitate DNS resolution at the application level, for example, with the user program 302.

In an embodiment, one or more applications such as the user program 302 may also bypass the DNS resolver 304 by not using the programming framework APIs and instead crafting their own DNS queries locally and directing these queries to (e.g., directly to) a predefined DNS server. Either method or way such as using the DNS resolver 304 or bypassing it may be used with the embodiments such as the extensions disclosed herein.

Referring back to FIG. 4, at 2, a DNS selection and/or resolution such as a primary DNS selection or resolution may be performed. For example, the DNS resolver 302 may receive a name resolution query at 11. At 2, the DNS resolver 304 may try to resolve the name resolution query by looking at a local DNS cache 306. For example, if the target domain name may have been recently used it may be stored along with an appropriate resolution such as an indication of where to route the DNS in the DNS cache. As such, at 2, the DNS resolver 304 may compare the target domain name or information in the name resolution query received at 11 with information and/or names in the DNS cache 306. If the target domain name may not be present in the DNS cache 306, the DNS resolver 304 may resolve the target domain name using a name server such as a foreign name server including, for example, the first and/or second DNS server 208, 212.

The algorithms, procedures, methods, and/or actions that may be used to perform the primary DNS selection may be independent from and compatible with the embodiments disclosed herein. In an embodiment, the DNS resolver 304 may make an initial DNS server selection, for example, based on or according to its own algorithm and/or actions, methods, or procedures. For example, the DNS resolver 304 may be a legacy DNS resolver that may direct queries to a default DNS server. In an embodiment, an operating system such as a legacy operating system by default (e.g., via an algorithm, action, method, and/or procedure) may use the DNS server of the last used, activated, and/or connected interface for DNS resolution.

The DNS resolver 304 may be an advanced DNS resolver that may use an advanced DNS server selection algorithm such as an improved recursive DNS server selection for multi-interfaced nodes algorithm. For applications that may bypass the DNS resolver 304, DNS server selection may be application specific. For example, the DNS server may be selected for DNS resolution based on actions, algorithms, procedures, and/or the like that may be included in the application and/or indicated thereby. Regardless of such methods, algorithms, procedures, and/or actions used, a DNS server selection may be performed at 2 such that a primary DNS Server may be selected and a DNS query or request may be sent or provided at 12. In an embodiment, the DNS query or request may include an identifier (e.g., an interface identifier as described herein) such as an IP address of the DNS server or interface thereof it may wish to resolve to and/or may want to reach as well as a QNAME associated with the target domain name to resolve. For example, if the device may want to resolve of the target domain name or URLS such as www.xxx.com of FIG. 2, the DNS query or request may include the identifier (e.g., an interface identifier and/or a primary DNS server IP address) of an interface such as the first or second interfaces 218, 220 and/or the DNS server such as the first or second DNS servers 208, 212 associated therewith and the QNAME (e.g., www.xxx.com) for the website and/or an IP address associated therewith.

According to an embodiment, at 3, a secondary DNS selection may be performed. As described herein, the primary DNS selection may be completed, for example, at 2. At 3, a DNS routing function 308 disclosed herein may intercept the DNS query or request sent or provided at 12 (e.g., may receive the DNS request or query) and may perform a secondary DNS selection. According to an embodiment, the DNS routing function may perform the secondary DNS selection using information such as a policy or rule included or provided by an ANDSF ISRP MO 310 that may be received from an ANDSF server as described herein. Additionally, in an embodiment, DNS may use a particular destination port such as destination port #53 that may be monitored and/or intercepted to identify DNS packets including the DNS request or query that may be received at 12 to perform secondary DNS selection.

Other methods or techniques for performing the packet interception (e.g., interception of the DNS request or query) may also be used to enable the secondary DNS selection at 3. The methods or techniques that may be used to perform the packet interception (e.g., interception of the DNS query and packets associated therewith) may be operating system (OS) dependent. For example, an OS may support an iptables framework. The iptables framework may be used to perform interception of outbound packets with the destination port #53.

For example, one or more iptables commands may be used to intercept User Datagram Protocol (UDP) traffic with the destination port #53 in an outbound direction. The intercepted packets may be pushed in a queue. The DNS routing function 308 may include and/or use a netfilter programming API to retrieve the intercepted packets, for example, from the DNS resolver 304. The DNS routing function 308 may then make its routing decision based on the ISRP MO as described herein. In an embodiment, once the decision may be made, the DNS request may be modified according to the chosen DNS server and/or interface associated therewith and the packet may be let go in the outbound direction.

Socket hooking may be used to perform the interception of the DNS query or request and/or the packets associated therewith. For example, socket hooking may include inserting proprietary function calls at the beginning of one or more socket functions. When a socket function may be invoked, this proprietary code may be executed. Using such a technique may provide an opportunity to inspect the packets transmitted, for example, from the DNS resolver 304 and may allow or enable the secondary DNS selection to be performed as described herein. Additional methods or techniques may be used to intercept outbound traffic from the DNS resolver 304 such as the DNS query or request.

The DNS routing function 308 may determine, at 3, whether a target domain name or a target URL such as www.xxx.com described with respect to FIG. 2 that may be intercepted may match or correspond to information or a name included in the ISRP MO. For example, at 3, the DNS routing function 308 may perform a check to see whether the query name and the target domain name or corresponding target URL of the query name in the DNS query or request that may be received or intercepted at 12 may match a DNSQueryName and/or a DomainName node that may be included in the ISRP MO. To perform the match, the DNS routing function 308 may obtain the target URL or target domain name associated with the query name from a payload of the DNS query or request that may be intercepted at 12 as described herein.

For example, in an embodiment, a Question section of a DNS query or request that may be intercepted may have a format, for example, as shown in FIG. 5. The QNAME field of the Question section, for example, shown in FIG. 5 may include the URL to be resolved. The QNAME may be stored, restored, or included in a null terminated string format and/or may be stored restored, and/or included in the DNSQueryName shown in FIG. 3A and/or the DomainName shown in FIG. 3B that may be part of the ISRP MO such that the QNAME in the string or DNSQueryName and/or DomainName field, node, or attribute may be used to find a match such as a highest priority match for DNS resolution.

According to an embodiment, a RoutingRule that may be associated with the DNSQueryName and/or DomainName may indicate which interface may be used to perform a DNS selection (e.g., a final DNS selection). As described herein, the RoutingRule may include, indicate, and/or specify an interface (e.g., via an interface identifier) associated with a DNS server to route the DNS query. For example, the DNSQueryName and/or DomainName may include a RoutingRule and/or other information, policies, and/or provisions that may be used to determine which interface and DNS server such as the first DNS server 208 as shown or the second DNS server 212 to select, for example, as part of the secondary DNS selection and resolution. If there may be a match or a match may be established, the RoutingRule may be used, parsed, and/or processed to determine or identify the interface to use for the secondary DNS selection. At 13, the DNS query or request may be provided, routed, or sent to the DNS server such as the first DNS server 208 associated with the interface that may be indicated, specified, and/or included (e.g., via an identifier) in the RoutingRule as shown or the second DNS server 212 associated with an interface that may be indicated, specified, and/or included (e.g., via an identifier) in the RoutingRule.

In an embodiment, the DNS routing function 308 may also have to modify the IP address (e.g., the primary DNS server IP address or destination IP address) in the DNS query or request to match the DNS configuration of the selected interface. For example, if there may be a match, the DNS routing function 308 may modify the identifier or IP address (e.g., the primary DNS server IP address or the destination IP address) of the DNS server provided in the DNS query or request received at 12 (e.g., a first identifier and/or first IP address of the primary DNS selection) with the identifier or IP address (e.g., a second identifier and/or a secondary DNS server IP address) of the interface and/or the secondary DNS server associated therewith such as the first DNS server 208 that may be selected by the DNS routing function 308 and may be specified by an interface such the first interface 218 and/or included in ISRP MO such that the DNS query or request may be sent, provided, and/or routed to the first DNS servers 208 (e.g., via the first interface 218) as shown in FIG. 4, for example.

Additionally, the DNS query or request may be unaffected and may be sent towards the interface initially selected in the primary DNS selection. For example, if there may be no match, the DNS query or request may pass through the DNS routing function 308 unaffected and/or unmodified and the unaffected and/or unmodified DNS query or request may be sent to the DNS server selected by the DNS resolver 304 such as the first DNS server 208 and/or the second DNS server 212 (e.g., via the first and/or second interfaces 218, 220).

In an example embodiment, the DNS routing function 308 may work for user applications that may not use the DNS resolver 304 and may instead choose to perform a local DNS implementation, at 3. In such an embodiment, the DNS routing function 308 may be able to intercept DNS queries at 11 and may perform a foreign DNS server selection such as the primary DNS server selection.

As shown in FIG. 4, at 4, the DNS query or request may be resolved. For example, at 13, a DNS server such as the first DNS server 208 (e.g., a foreign DNS server) may receive the DNS query or request. At 4 (e.g., upon receipt of the DNS query or request), the DNS server such as the first DNS server 208 may attempt to resolve the DNS query or request as described herein. For example, the DNS query or request may include the target domain name www.xxx.com described with respect to FIG. 2. In an embodiment, at 4, the first DNS server 208 may resolve the target domain www.xxx.com to the content repository 210 such that the content thereof may be provided to the device as described herein.

The DNS server such as the first DNS server 208 may also return, send, and/or provide a success and/or error response such as a DNS response depending on its capability to resolve the DNS query or request at 14. The DNS server such as the first DNS server 208 may perform additional processing and/or may execute additional algorithms, procedures, and/or methods. For example, the DNS server may provide an answer at 14 or it may query other DNS servers if it may not know the IP address (e.g., the DNS server may perform a non-recursive query and/or a recursive query). The embodiments described herein may not affect the processing that may be performed in or on the DNS server.

At 5, the DNS resolver 304 may receive the DNS response and may process the DNS response according to or based on one or more of its own algorithms. For example, the DNS resolver 304 may receive the response, add the value to its local cache, and/or may inform the application of the resolved IP address. Additionally, the IP address obtained (e.g., for the domain name or website) may be returned to the application that may have triggered the resolution. For example, the DNS resolution that may have been triggered by the user application and/or functions such as the InetAddress Java class or function and/or the gethostbyname(const char url) class or function associated therewith may block and/or suspend activity or execution (e.g., of the application) until the DNS resolver 304 may provide the IP address in return or an error if the IP address could not be resolved. The embodiments described herein may further not affect the processing that may be performed by the DNS resolver 304. A user response may then be provided to the user program 302 which initiated the DNS resolution at 15.

At 6, the user program 302 may be informed of the IP address resolution (e.g., using suitable techniques or methods and may establish a connection to the IP Address obtained from the DNS server 208. For example, as described herein, the application may call a function such as the InetAddress Java class or function and/or the gethostbyname(const char url) class or function and it may block (e.g., stop executing) until the resolution may complete. The execution may be resumed by the DNS resolver 304 that may return the requested IP address or an error if the address may not have been found. If the user application may be a browser, resolving the IP address of www.xxx.com may enable the browser to open a HTTP connection to the IP address of www.xxx.com and from there load the web page and content thereof. If the user application may be an e-mail client, resolving the IP address of the e-mail server URL may enable the e-mail client to open a connection to the IP address of the e-mail server and access the e-mail content. The embodiments described herein may not affect the methods or techniques that may be used to inform the user program 302 of the IP address resolution.

According to an embodiment, the DNS routing function 308 may be embedded inside the DNS Resolver 304, for example, such that the processing performed at 2 and 3 may be part of or integrated into the DNS resolver algorithm with the logical actions or processes described herein, for example, remaining the same. The DNS routing function 308 may be put or located before the DNS resolver such that the processing at 2 and 3 may be reversed with the overall logical actions or processes described herein, for example, remaining the same.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) with multiple interfaces configured to extend Inter System Routing Policies (ISRPs) of an ANDSF to enable domain name system (DNS) flows to be resolved, the WTRU comprising:
   a processor configured to:
      intercept a domain name system (DNS) query comprising a query name associated with a target domain name and a primary DNS server Internet Protocol (IP) address associated with a primary DNS server or interface associated therewith to resolve the target domain name;
      receive an ISRP management object (MO) comprising a DNS query name or a domain name and a routing rule associated with the DNS query name or domain name, the routing rule specifying an interface associated with a secondary DNS server to select and route the DNS query to, the secondary DNS server being capable of resolving a private resource for the target domain name in the DNS query;
      determine whether the query name in the DNS query matches the DNS query name or domain name included in the ISRP MO; and
      route the DNS query to the secondary DNS server or the interface associated therewith using a secondary DNS server IP address associated with the interface specified in routing rule when, based on the determination, the query name in the DNS query matches the DNS query name or domain name included in the ISRP MO such that the target domain name is resolved by the secondary DNS server associated with the interface included in the routing rule and the private resource of the target domain name is available to the WTRU.

2. The WTRU of claim 1, wherein the processor is further configured to modify the DNS query to replace the primary DNS server IP address associated with the primary DNS server or interface associated therewith with the secondary DNS server IP address associated with the interface specified in the routing rule when, based on the determination, the query name in the DNS query matches the DNS query name or domain name included in the ISRP MO.

3. The WTRU of claim 1, wherein the query name corresponds to a target uniform resource locator (URL) of a website, and wherein the target URL is compared to the DNS query name or domain name in response to the interception of the DNS query to determine whether there is a match.

4. The WTRU of claim 1, wherein the primary DNS server is selected by:
   determining whether a query domain name is present in cache;
   resolving the query domain name via a foreign name server when the query domain name is not present in the cache; and
   selecting the primary DNS server or interface thereof based on one or more algorithms or actions.

5. The WTRU of claim 4, wherein the one or more algorithms or actions comprise a default DNS server to use as the primary DNS server, and wherein the default DNS server comprises a DNS server associated with an interface last connected to the WTRU.

6. The WTRU of claim 1, wherein the DNS query is intercepted by monitoring a destination port.

7. The WTRU of claim 6, wherein the DNS query is further intercepted by using an iptables framework along with the destination port.

8. The WTRU of claim 1, wherein the DNS query is intercepted using socket hooking.

9. A method for extending Inter System Routing Policies (ISRPs) of an ANDSF to enable domain name system (DNS) flows to be resolved in a wireless transmit/receive unit (WTRU) that supports multiple interfaces, the method comprising:
   intercepting a domain name system (DNS) query comprising a query name associated with a target domain name and a primary DNS server Internet Protocol (IP) address associated with a primary DNS server or an interface associated therewith to resolve the domain name;
   receiving an ISRP management object (MO) comprising a DNS query name or domain name and a routing rule associated with the DNS query name, the routing rule specifying an interface associated with a secondary DNS server to select and route the DNS query to, the secondary DNS server being capable of resolving a private resource for the target domain name in the DNS query;
   determining whether the query name in the DNS query matches the DNS query name or domain name included in the ISRP MO; and
   routing the DNS query to the secondary DNS server or the interface associated therewith using a secondary DNS server IP address associated with the interface specified in the routing rule when, based on the determination, the query name in the DNS query matches the DNS query name or domain name included in the ISRP MO such that the target domain name is resolved by the secondary DNS server associated with the interface included in the routing rule and the private resource of the target domain name is available to the WTRU.

10. The method of claim 9, further comprising modifying the DNS query to include the secondary DNS server IP address associated with the interface specified in the routing rule when, based on the determination, the query name in the DNS query matches the DNS query name or domain name included in the ISRP MO.

11. The method of claim 9, wherein the query name corresponds to a target uniform resource locator (URL) of a website, and wherein the target URL is compared to the DNS query name or domain name in response to the interception of the DNS query to determine whether there is a match.

12. The method of claim 9, wherein the DNS query is received from a DNS resolver included in the WTRU.

13. The method of claim 9, wherein the primary DNS server is selected according to the one or more of the following:
   determining whether the query domain name is present in cache;
   resolving the query domain name via a foreign name server when the query domain name is not present in the cache; and
   selecting the primary DNS server or interface thereof based on one or more algorithms or actions associated with the DNS resolver.

14. The method of claim 13, wherein the one or more algorithms or actions comprise selecting a default DNS server, and wherein the default DNS server comprises a DNS server associated with an interface last connected to the WTRU.

15. The method of claim 9, wherein the DNS query is intercepted by monitoring a destination port.

16. The method of claim 15, wherein the DNS query is further intercepted by using an iptables framework along with the destination port.

17. The method of claim 9, wherein the DNS query is intercepted using socket hooking.

18. A wireless transmit/receive unit (WTRU) with multiple interfaces configured to extend Inter System Routing Policies (ISRPs) of an ANDSF to enable domain name system (DNS) flows to be resolved, the WTRU comprising:
   a processor configured to:
      receive an ISRP management object (MO) comprising a DNS query name or domain name and a routing rule associated with the DNS query name, the routing rule specifying an interface and an associated DNS server to select and route a DNS query to, the DNS server being capable of resolving a private resource for the domain name in the DNS query;
      determine whether a target domain name associated with a website to be accessed matches the DNS query name or domain name included in the ISRP MO; and
      route the DNS query to the DNS server associated with the interface specified in the routing rule when, based on the determination, the domain name in the DNS query matches the DNS query name included in the ISRP MO such that the target domain name is resolved by the DNS server associated with the interface included in the routing rule and the private resource of the target domain name is available to the WTRU.

19. The WTRU of claim 18, wherein the processor is further configured to modify the DNS query to include an IP address of the DNS server associated with the interface specified in the routing rule when, based on the determination, the query name in the DNS query matches the DNS query name or domain name included in the ISRP MO.

20. The WTRU of claim 18, wherein the query name corresponds to a target uniform resource locator (URL) of a website, and wherein the target URL is compared to the DNS query name or domain name in response to the interception of the DNS query to determine whether there is a match.

* * * * *